(No Model.)
R. W. HARDIE.
DISK HARROW.
No. 496,198. Patented Apr. 25, 1893.
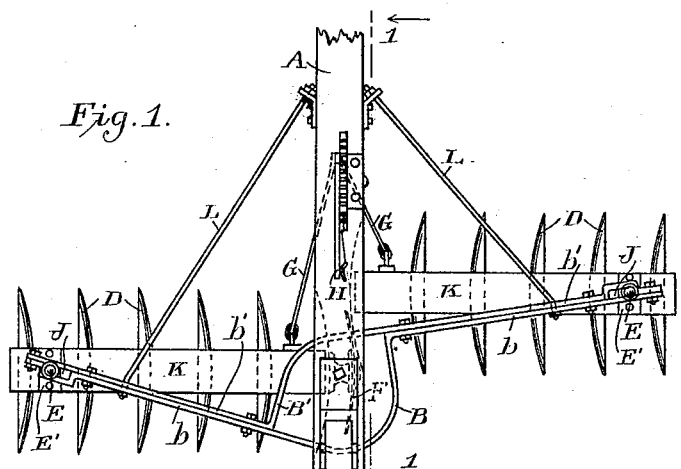
Fig. 1.
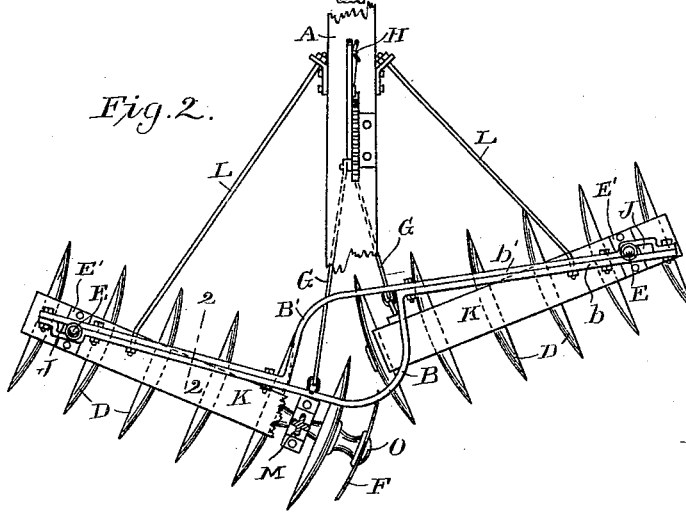
Fig. 2.
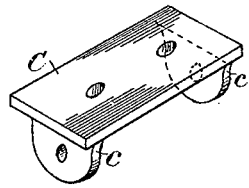
Fig. 4.
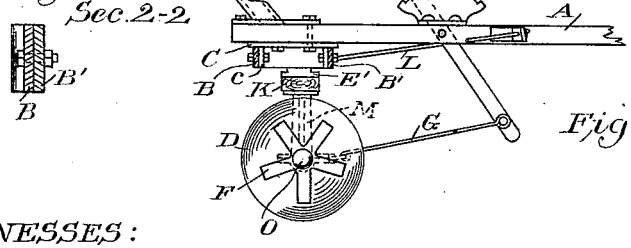
Fig. 5. Sec. 2-2.
Fig. 3. Sec. 1-1.
WITNESSES:
John W. Fisher
Walter Melius
INVENTOR
Robert W. Hardie

UNITED STATES PATENT OFFICE.

ROBERT W. HARDIE, OF ALBANY, NEW YORK.

DISK HARROW.

SPECIFICATION forming part of Letters Patent No. 496,198, dated April 25, 1893.

Application filed November 18, 1892. Serial No. 452,397. (No model.)

*To all whom it may concern:*

Be it known that I, ROBERT W. HARDIE, a citizen of the United States, residing at Albany, in the county of Albany and State of New York, have invented certain new and useful Improvements in Disk Harrows; and I do hereby declare the following to be a full, clear, and exact description of the invention, such as will enable others skilled in the art to which it appertains to make and use the same.

My invention has for its object to provide means for cultivating the strip, or ridge, of earth usually left between the inner ends of the gangs of a disk harrow. This I accomplish: first, by arranging the gangs so that the inner disk of one gang shall be behind the corresponding disk of the opposing gang, and by securing the disk gangs to the main frame, so as to have a limited bodily movement in the direction of their length; second, by securing an auxiliary cutter to the inner end of the rear gang.

In the accompanying drawings Figure 1. is a plan view of the parts constituting my invention, arranged as when not in use. Fig. 2. is a plan view of the same parts arranged in working position. Fig. 3 is a vertical, longitudinal section taken on line 1—1 of Fig. 1. Fig. 4. is a perspective view of the plate to which the pole is attached. Fig. 5. is a vertical cross-section of frame taken on line 2—2 of Fig. 2.

As illustrated in the drawings, the main frame of the harrow consists of a pole "A" secured to a cross-bar formed of sections B and B' so as to make an enlarged central portion and a laterally extending bar on each side thereof, of which bars one is arranged in advance of the other. A plate "C" having depending lugs "c" may be used for securing the pole to the cross-bar. When such construction is used, the lugs "c" are secured to the enlarged portion of the cross-bar by means of horizontal bolts as shown in Fig. 3. and the pole "A" is bolted to the top of the plate "C."

The disk gangs are of ordinary construction and consist of a series of disks "D" mounted on an axle "O" in the usual manner. The disk gangs are connected to the cross-bar by means of bolts, or studs, "E" formed on a base "E'" which permit the gangs to vibrate vertically and horizontally and engage with slots "J" formed on the ends of the cross-bar, which thereby enable the gangs to have a free movement bodily in the direction of their length. The inner end of the rear gang is provided with a revolving cutter "F" which is smaller in diameter than the main cutters, so that the cutter may be brought close to the disk of the opposite gang when in use, and at the same time permit the inner disk of the rear gang to be brought substantially in line with the inner disk of the opposing gang. I prefer to make this cutter of spades or bars, as shown in Fig. 3, so that the ground may be dug up, or spaded, and left level rather than turned into a furrow as with an ordinary disk. I do not desire to be limited to such construction however, as an auxiliary disk may be used without departing from my invention. The inner ends of the gangs are connected by means of rods "G" with a set lever "H" mounted on the pole.

When the harrow is in use, the inner ends of the gangs are moved backward by the lever "H" and the pressure of the earth against the faces of the disks forces the gangs inward bodily lengthwise. The bolts "E" are then at the innermost portion of the slots "J," the inner disks of each gang are arranged one behind the other and the auxiliary cutter "F" between the inner disks of the gangs.

When the gangs are arranged as shown in Fig. 2. a small ridge of earth will be left uncultivated by the inner disks of the gangs, even when the forward edge of the inner disks travel in the same longitudinal line. This ridge has sloping sides corresponding with the curvature of the convex sides of the inner disks. The auxiliary cutter "F" traverses this ridge and cultivates it, and leaves the ground substantially level. By the use of spaders to form an auxiliary cutter, the gangs are not liable to become clogged between their ends with roots or earth.

The enlarged portion of the main frame provides means for supporting the pole and for limiting the upward movement of the inner ends of the gangs.

The adjustable hinge connection may be varied without departing from my invention, provided the gangs are free to have an inward bodily movement.

What I claim is—

1. In a disk harrow the combination with a main frame, of disk gangs pivoted thereto so as to have a bodily lengthwise movement and arranged with the inner disk of one gang behind that of the opposing gang, and an auxiliary cutter smaller in diameter than the main disks secured to the inner end of the rear gang, substantially as shown and described.

2. In a disk harrow. the combination with a main frame, of disk gangs pivoted thereto so as to have a bodily lengthwise movement, and arranged with the inner disk of one gang behind that of the opposing gang, and an auxiliary cutter composed of spading bars arranged within a circle having a shorter diameter than the main cutters, secured to the inner end of the rear gang, substantially as shown and described.

In testimony whereof I affix my signature in presence of two witnesses.

ROBERT W. HARDIE.

Witnesses:
CHAS. H. MILLS,
CHARLES F. BRIDGE.